(12) United States Patent  (10) Patent No.: US 7,555,903 B2
Tarasinski et al.  (45) Date of Patent: Jul. 7, 2009

(54) TIRE PRESSURE REGULATING SYSTEM

(75) Inventors: Nicolai Tarasinski, Frankenthal (DE); Joachim Sobotzik, Lambsheim (DE); Bernd Kneer, Viernheim (DE); Fritz Glaser, Zweibrücken (DE)

(73) Assignee: Deere & Company, Moline, IL (US)

( * ) Notice: Subject to any disclaimer, the term of this patent is extended or adjusted under 35 U.S.C. 154(b) by 154 days.

(21) Appl. No.: 10/572,641

(22) PCT Filed: Sep. 10, 2004

(86) PCT No.: PCT/EP2004/010089

§ 371 (c)(1),
(2), (4) Date: Jan. 26, 2007

(87) PCT Pub. No.: WO2005/037576

PCT Pub. Date: Apr. 28, 2005

(65) Prior Publication Data

US 2007/0144171 A1 Jun. 28, 2007

(30) Foreign Application Priority Data

Sep. 20, 2003 (DE) ................................. 103 43 621

(51) Int. Cl.
F02D 23/00 (2006.01)
B60C 23/14 (2006.01)
B60C 23/10 (2006.01)
B60C 23/00 (2006.01)
B60K 28/16 (2006.01)
B60K 1/00 (2006.01)
B60K 6/00 (2006.01)

(52) U.S. Cl. .................... 60/602; 152/415; 152/416; 152/417; 180/197; 180/65.2

(58) Field of Classification Search ............. 180/41, 180/197, 65.2, 65.4, 65.1; 60/602; 152/415, 152/416, 417; 141/95
See application file for complete search history.

(56) References Cited

U.S. PATENT DOCUMENTS

| 2,943,637 | A | * | 7/1960 | Eichenauer | 137/224 |
| 4,421,151 | A | * | 12/1983 | Stumpe | 152/417 |
| 4,510,979 | A | * | 4/1985 | Hjorth-Hansen | 141/95 |
| 5,121,604 | A | * | 6/1992 | Berger et al. | 60/602 |
| 5,647,927 | A | * | 7/1997 | Mason | 152/415 |
| 5,906,480 | A | * | 5/1999 | Sabelstrom et al. | 60/609 |
| 6,098,682 | A | * | 8/2000 | Kis | 152/415 |
| 6,102,146 | A | * | 8/2000 | Schmidt et al. | 180/197 |
| 6,209,323 | B1 | * | 4/2001 | Schmidt et al. | 60/602 |
| 6,220,032 | B1 | * | 4/2001 | Schmidt et al. | 60/602 |
| 6,378,305 | B1 | * | 4/2002 | Sumser et al. | 60/602 |
| 6,584,772 | B2 | * | 7/2003 | Haupt et al. | 60/602 |
| 6,625,984 | B2 | * | 9/2003 | Gerke et al. | 60/602 |
| 6,625,986 | B2 | * | 9/2003 | Mazaud et al. | 60/602 |
| 6,651,430 | B2 | * | 11/2003 | Meier et al. | 60/602 |
| 6,705,084 | B2 | * | 3/2004 | Allen et al. | 60/608 |
| 6,892,776 | B2 | * | 5/2005 | Skoff | 152/415 |
| 6,928,817 | B2 | * | 8/2005 | Ahmad | 60/602 |
| 6,943,673 | B2 | * | 9/2005 | Skoff et al. | 152/415 |
| 6,973,785 | B2 | * | 12/2005 | Umehara et al. | 60/605.2 |
| 7,028,793 | B2 | * | 4/2006 | Hu et al. | 180/65.2 |
| 2002/0121323 | A1 | * | 9/2002 | Tarasinski | 152/416 |

* cited by examiner

*Primary Examiner*—Thai Ba Trieu

(57) ABSTRACT

The invention relates to a system for regulating the pressure of tires mounted on a vehicle. The vehicle has an engine with a turbocharger which is a compressed air source for the pressure regulating system. The turbocharger has a variable geometry in order to supply a sufficiently high pressure.

7 Claims, 3 Drawing Sheets

TIRE PRESSURE REGULATING SYSTEM

FIELD OF THE INVENTION

The invention relates to a tire-pressure regulating system for setting the pressure of the tires mounted on a vehicle. The tire-pressure regulating system comprises, among other things, a compressed-air source. The vehicle has an internal combustion engine with a turbocharger, wherein the turbocharger is provided as the compressed-air source for the tire-pressure regulating system.

BACKGROUND OF THE INVENTION

Agricultural vehicles, in particular, such as tractors, combines, and trailers, as well as comparable vehicles, which are used on soft ground, are frequently equipped with large volume tires in order to achieve good terrain handling, good traction properties, and low ground pressure. Traction and ground pressure are especially low if low air pressure is set in the tires, so that in the field, operation with low tire pressure is preferred. However, with decreasing tire pressure, the carrying capacity of the tires decreases, and the rolling resistance and tire wear increases. Therefore, when traveling on hard ground, a high air pressure should be selected. To satisfy these contradictory requirements, tire-pressure regulating systems are used like those, for example, from DE 198 04 249 A1 or U.S. Pat. No. 5,647,927. With the aid of a tire-pressure regulating system, the tire air pressure can be adjusted optimally to the requirements of the corresponding use. The air pressure required for filling the tires in these tire-pressure regulating systems is provided by a compressor, which feeds an air pressure container.

From DE 101 11 532 A1, a tire-pressure regulating system is known in which the turbocharger of an internal combustion engine of a vehicle is used as a pressure source. In this way, previously typical storage containers can be eliminated, which is associated with considerable cost advantages. This tire-pressure regulating system is in the position to fill or to deflate the tires of a vehicle sufficiently quickly.

For quick tire filling, a sufficiently high air pressure of the compressed-air source is required, which, however, cannot be made available by the turbocharger without an additional load on the internal combustion engine, because the turbocharger generates too low a pressure, for example, in idle running of the internal combustion engine. A sufficient load of the internal combustion engine could be generated, for example, by a load of the on board hydraulic system or the drive mechanism. However, this, in turn, is difficult to realize because in such a case, the use of other tractor functions could be limited.

SUMMARY OF THE INVENTION

Accordingly, an object of this invention is to provide a tire pressure regulating system of the type described above, through which the previously mentioned problems can be solved.

A further object of the invention is to provide such a tire pressure regulating system wherein the compressed-air source necessary for filling the tires should provide a high air pressure and a high air output volume in order to achieve relatively quick tire filling.

These and other objects are achieved by the present invention, wherein a tire-pressure regulating system is supplied with pressurized air from a turbocharger which has a variable geometry.

In principle, the problems for setting the dimensions of a turbocharger for an internal combustion engine consists in that the turbocharger must provide the necessary air compression for all of the operating conditions of the internal combustion engine. Therefore, for the different operating conditions of the internal combustion engine, turbochargers with variable geometry are used, which is known, for example, from DE 102 47 216 A1.

Also, the turbocharger with variable geometry known from DE 198 13 944 A1 involves an exhaust gas turbocharger, which essentially consists of two flow machines, namely a turbine operated by the exhaust gas flow and a compressor, which is driven by the turbine and which precompresses a fresh air flow for the internal combustion engine. DE 198 13 944 A1 primarily concerns itself with achieving ideal operating parameters of the internal combustion engine and making available the full power capacity of the internal combustion engine at low ambient temperatures.

The turbine geometry can be adjusted, for example, by adjustable guide blades of the turbine, whereby the flow cross section of the turbine and thus the dynamic pressure energy to be transferred by the air compressor to the charged air flow is varied. In this respect, the turbochargers with variable geometry known from the state of the art are used exclusively to make available charged air with an optimum charged air pressure as a function of the instantaneous operating state of the internal combustion engine.

According to the invention, it has become known that a sufficient charged air pressure can also be made available when filling a tire with the aid of the tire-pressure regulating system according to the invention when the internal combustion engine and the turbocharger coupled to this engine do not operate under full load. Thus, for example, the internal combustion engine could be operated in an increased idle rpm state, wherein the geometry of the turbocharger is set so that the air pressure in the charged air compressor part of the turbocharger, on the one hand, is sufficient for feeding the combustion air necessary in this operating mode to the internal combustion engine for optionally optimum air pressure conditions and, on the other hand, for making available an air pressure as a pressure source for the tire-pressure regulating system, which equals, for example 2 bar and which enables a relatively quick filling of one tire of the vehicle. Thus, through the use of a turbocharger with a variable geometry, in an extremely advantageous way, a compressed-air source that is provided solely for the tire-pressure regulating system is eliminated, whereby the tire-pressure regulating system according to the invention can be manufactured structurally more simply and above all more economically relative to the tire-pressure regulating systems known from U.S. Pat. No. 5,647,927 and DE 198 13 944 A1. In particular, agricultural or commercial vehicles, which are typically equipped with an internal combustion engine in the form of a diesel motor, include a turbocharger with fixed geometry. In such vehicles, for implementing a tire-pressure regulating system, only one turbocharger with a variable geometry is to be provided, wherein the extra costs for this arrangement bear no relation to the provision of an "individual" compressed-air source necessary for conventional tire-pressure regulating systems. In comparison to DE 102 47 216 A1, a tire can also be filled with air relatively quickly when the internal combustion engine is not fully loaded.

Now, the geometry of a turbocharger can be varied in many ways. On this point, refer to the appropriate state of the art. In this respect, turbochargers with variable geometry already found on the market can be used for the purpose presented here. In a preferred embodiment, the geometry of the turbocharger can be varied by adjusting the guide blades and/or the working blades. Here, in an extremely advantageous way, a simple and above all quick variation of the air pressure made available by the turbocharger can be achieved.

Now the guide blades and/or the working blades can be changed relative to a charged air compressor part of the turbocharger. Alternatively or additionally, the guide blades and/or working blades can be adjusted relative to the exhaust gas turbine part of the turbocharger.

Conventionally, the guide blades and/or the working blades can be adjusted relative to the exhaust gas turbine part of the turbocharger. Alternatively or additionally, the guide blades and/or working blades can be adjusted relative to a charged air compressor part of the turbocharger.

In particular, the geometry of the turbocharger can be changed with the aid of a low pressure diaphragm dashpot connected to the turbocharger. For this purpose, a vacuum pump connected to the low pressure diaphragm dashpot could charge the low pressure diaphragm dashpot with low pressure. The vacuum pump, which is preferably driven electrically, can be dimensioned relatively small and operated, for example, at 12 V and a minimal residual pressure of approximately 250 mbar. The vacuum pump could be activated or deactivated with a separate on/off switch or by a corresponding controller. Alternatively, the geometry of the turbocharger could be changed with the aid of a low pressure diaphragm dashpot connected to the turbocharger.

Preferably, the high or low pressure between the vacuum pump and the high pressure or low pressure diaphragm dashpot can be broken down, so that the turbocharger receives its geometry corresponding to this state. The turbocharger could be designed such that, for the case in which low pressure is not applied to the low pressure diaphragm dashpot, the turbocharger has a geometry typically preferable for an internal combustion engine in a low-load state. With increasing low pressure, the turbocharger delivers a higher charged air pressure to the low pressure diaphragm dashpot.

In an extremely preferred embodiment, the tire-pressure regulating system according to the invention includes a controller with which the adjustment of the geometry of the turbocharger can be controlled or regulated. This controller could be formed, for example, in the form of a single board computer and could have corresponding control or regulating electronics. In this case, the control or regulation could be performed with the aid of electrical signals, for example, by the activation or deactivation of the vacuum pump named above, which charges the low pressure diaphragm dashpot of the turbocharger with low pressure.

Preferably, at least one pressure sensor and/or temperature sensor is provided which detect the pressure or the temperature on the suction and/or exhaust gas sides of the internal combustion engine. Such a sensor could convert the pressure or temperature detected by the sensor into electrical signals and feed them to the controller. In this way, for example, a control loop could be realized such that the geometry of the turbocharger is adjusted so that, for example, its guide blades can be set to a narrower passage, whereby an increase in pressure of the compressed air can be set to a predetermined air pressure for tire filling.

Furthermore, the controller of the tire-pressure regulating system could be fed information on the rpm and/or the loading of the internal combustion engine. In this respect, a variation of the geometry of the turbocharger can also be adapted to a possible load change of the internal combustion engine, which can occur under certain circumstances during a tire filling process. In any case, with this information, conclusions can be made on the instantaneously set geometry of the turbocharger, if this is not known or is to be measured directly.

In an extremely preferred embodiment, the controller of the internal combustion engine can be expanded by the functionality of the controller of the tire-pressure regulating system. As a result, the controller of the internal combustion engine and the controller of the tire-pressure regulating system can involve one component, so that, in an advantageous way, the current information, for example, on the set rpm of the internal combustion engine, can be included in the control of the variable turbocharger. By combining the two controllers into one common controller, the tire-pressure regulating system according to the invention can be manufactured more economically.

It is desirable to fill the tires in the shortest possible time and especially with minimal use of energy. This goal is dependent, among other things, on the initial situation of the filling process, because it is not useful, for example, for very low air pressure in the tires, to provide high air pressure at the output of the compressor turbine. This is because the filling time cannot be reduced significantly in this way and at best there occur high throttling losses and elevated heating of the air. However, for high air pressure in the tire, a high pressure level must be provided at the output of the turbine, so that the filling process can proceed quickly. The initial situation can be detected by pressure measurement at the output of the compressor turbine and/or in one or more tires, for example, by the controller. The measurement in the tire could be performed without contact with a transmitter receiver combination. In this way, the pressure sensor could be arranged with a transmitter in the tire and the receiver on the axle housing.

Starting with this situation, a function is to be defined, with reference to which the geometry of the turbocharger is adjusted. The function for changing the geometry of the turbocharger depends on the air pressure generated by the turbocharger and made available for the tire-pressure regulating system, optionally on the air pressure in at least one tire. Preferably, this function also depends on time. It is extremely preferred that the function depends on the profile of the charged air pressure after the compressor stage of the turbocharger; in this case a functional value is determined dynamically.

During the filling process, the turbocharger is typically operated under operating conditions other than normal internal combustion engine operation. Therefore, it is to be ensured that the turbocharger is not overloaded. For example, there can be a limit to the rpm of the turbocharger. Now the rpm of a turbocharger can be measured only with difficulty and not indirectly. In an advantageous embodiment, another function can be defined, wherein the geometry of the turbocharger is adjusted so that the functional values of the additional function are not exceeded. The additional function is determined, for example, from the measured pressure or temperature values. Accordingly, the rpm of the turbocharger is limited for the set geometry with the aid of the additional function by targeting changes to the geometry of the turbocharger.

Preferably, the additional function depends on the rpm of the turbocharger resulting from the change to the geometry of the turbocharger. In this way, in a corresponding implementation, the rpm limit for the turbocharger can be regulated by the additional function.

In another preferred embodiment, the instantaneously set turbocharger geometry can be determined. The currently set turbocharger geometry could be detected, for example, with the aid of location or position sensors and preferably fed to the controller of the tire-pressure regulating system. In this respect, it can be tested whether the geometry of the turbocharger set by the controller actually exists, which can be compared, for example, to the functional values of the additional function.

Now the rpm of the internal combustion engine could be operated within preset rpm limits when adding air to or removing air from the tire. The pressure in the charged air channel, which is also provided for the tire-pressure regulating system, is a function of the volume flow generated by the charged air compressor at a given motor rpm in a characteristic way. The pressure initially increases with increasing volume flow, then reaches a maximum, and decreases again at higher volume flows. At different engine rpms and for a constant turbocharger geometry, the pressure maximum shifts and lies at different volume flow values. In order to guarantee a sufficient pressure for filling the tire, an advantageous refinement of the invention proposes to keep the rpm of the combustion engine within preset rpm limits during the filling process and/or the emptying process. The rpm limits are selected so that the turbocharger operates in the region of its maximum pressure for a set favorable geometry. In detail, the upper rpm limit is set so that the combustion engine is not overloaded and thus its service life is not reduced for frequent use of the tire-pressure regulating system.

Now if, for whatever reason, too high an air pressure is established in the charged air channel, in a preferred embodiment, a waste gate valve can be connected to the charged air channel of the combustion engine. A waste gate valve is known, for example, from U.S. Pat. No. 5,857,337 and is used there, among other things, to set the optimum operating point of the combustion engine. In particular, for too high a pressure in the exhaust gas channel, a portion of the exhaust gas can be discharged via the waste gate valve, so that a maximum rpm of the turbocharger is not exceeded.

It is conceivable, in special applications of the invention, that the pressure provided by the turbocharger is not always sufficient to be able to perform optimum tire filling. To provide aids here, a preferred improvement of the invention proposes to provide another air compressor, which further increases the pressure of the compressed air provided by the turbocharger. As an air compressor, a correspondingly designed compressor can be used, which is arranged between the turbocharger and a tire-filling valve device, that is, it is arranged after the turbocharger on the suction side of the combustion engine referenced to one tire.

In another embodiment, in the suction channel between the turbocharger and the combustion engine is a charged air cooler, in order to cool, among other things, the air provided for filling the tire, so that the tire is not overheated during the filling.

In detail, for filling and/or for removing air from a tire, there is at least one connecting line between the turbocharger and a wheel. The connecting line could be embodied in the form of a line system, which has, for example, branches connected to connecting lines leading to the tires of the individual wheels.

In principle, it is conceivable to provide various disassembly steps of a tire-pressure regulating system according to the invention. Thus, the connecting line could be mounted permanently to the vehicle at least in sections, as is the case, for example, for hydraulic components of a vehicle. In the highest disassembly step of this concept, a rotary transmission leadthrough could be provided for transmitting the air between the rotating wheel and the stationary part of the vehicle. In terms of the rotary transmission leadthroughs, refer to the technology known from the state of the art. Finally, as an example, refer to DE 199 50 191 C1.

Furthermore, it is conceivable that the connecting line can be established manually, at least in sections. In this respect, for the vehicle, one part of the provided connecting lines can be mounted permanently to the vehicle and the other part of the connecting line is connected manually by an operator, for example, by means of a flexible hose coupling. This type of configuration is particularly well-suited for retrofitting of a vehicle already in use, because the part of the connecting line mounted permanently to the vehicle (beginning typically on the suction side between the turbocharger and the combustion engine) can be retrofitted relatively easily, whereas retrofitting a rotary transmission leadthrough between the wheel and axle is associated with considerably greater complexity.

Thus, one end of a hose coupling could be connected reversibly to a coupling system provided on the wheel. This coupling system preferably involves a quick connect system, so that the vehicle operator can establish the hose connection manually with only a few manual actions quickly and easily. The other end of a hose coupling could be connected to a coupling connection on the vehicle. This vehicle side coupling connection could be allocated to the connecting line of the tire-pressure regulating system. Now, the end of the hose coupling allocated to the vehicle side coupling connection could also be equipped with a quick connect system, so that, for example, both ends of a hose coupling are connected manually by the vehicle operator, on one side to the coupling connection and, on the other side, to the wheel. In this case, the vehicle side end of the hose coupling can also be connected reversibly to the coupling connection. On the other hand, the vehicle side end of the hose coupling could be connected permanently to the coupling system, so that a vehicle operator only need connect the wheel side end of the hose coupling for putting air into or letting air out of a tire. In this embodiment, the vehicle side quick connect couplings are eliminated and the hose couplings are then stored in a corresponding holder on the vehicle when air is not being put into or let out of the tires.

In a preferred embodiment, in which a hose coupling is equipped on at least one end with a coupling system or with a quick connect system, at least one end of a hose coupling has a self locking quick connect coupling, which is not locked in the state coupled to the coupling connection. In this respect, such a quick connect coupling automatically seals, so that, for example, immediately after removing a quick connect coupling to the wheel of the vehicle, on the one hand, no air escapes from the tire and, on the other hand, no air possibly still under pressure escapes to the outside from the tire-pressure regulating system.

For achieving a sufficiently quick filling or emptying of the tire, a hose coupling and/or a connecting line of the tire-pressure regulating system has at least a cross section or an open diameter of ½ in, i.e., approximately 1.3 cm. At such a cross section for the line, there are almost no throttling losses or temperature increases of the line parts.

In an extremely preferred embodiment of the tire-pressure regulating system according to the invention, means are provided with which the air pressure of the air moved into a tire can have an upper limit. Such means could have, for example, an automatic pressure switch which breaks the connection between the turbocharger and the tire when the air pressure exceeds a preset value. An upper air pressure limit could be, for example, 1.6 bar. This prevents, in the extreme case, the tire from bursting.

Furthermore, means could be provided with which the air pressure of the air moved out of the tire can have a lower limit. These means could also have, for example, an automatic pressure switch which breaks the connection between the tire and the surroundings when the air pressure falls below a preset value. This prevents the tire from completely deflating when letting air out of the tire and prevents the vehicle from being lowered onto the rims. A lower air pressure limit could be, for example, a value of 0.3 bar.

In detail, a non return valve could be provided between the turbocharger and a tire. This non return valve prevents excess pressure from the tire from acting on the turbocharger or from tire filling to occur only when the turbocharger side air pressure has a higher value than the wheel side air pressure.

In a preferred embodiment, there are means for damping the sound produced when air is let out of the tire. A large amount of noise is generated, in particular, for quick emptying of a tire, when a large air volume escapes through a hose coupling or through a connecting line into the surroundings. Preferably, the means for damping the sound has a pressure limiting valve.

Particularly for inspection by the vehicle operator, in a preferred embodiment there is a manometer which displays the air pressure in the tire-pressure regulating system or in the tire.

In a preferred embodiment, the tire-pressure regulating system according to the invention is formed so that each tire of the vehicle can be set with a different air pressure. Preferably, the tires allocated to each axle of the vehicle have essentially the same air pressure.

Furthermore, with the tire-pressure regulating system of the vehicle, the air pressure of the tires for a trailer that can be attached to the vehicle is also adjustable. In this respect, in an especially advantageous way, the tire pressure of the entire frame can be set according to the corresponding work situation. Preferably, the air pressure of a tire of the trailer can be set to a different value than the air pressure of a tire of the vehicle. In this way, for example, the air pressure of the tires of the trailer can be set according to the load situation or according to the current weight of the trailer.

DESCRIPTION OF THE PREFERRED EMBODIMENT

Figure 1:
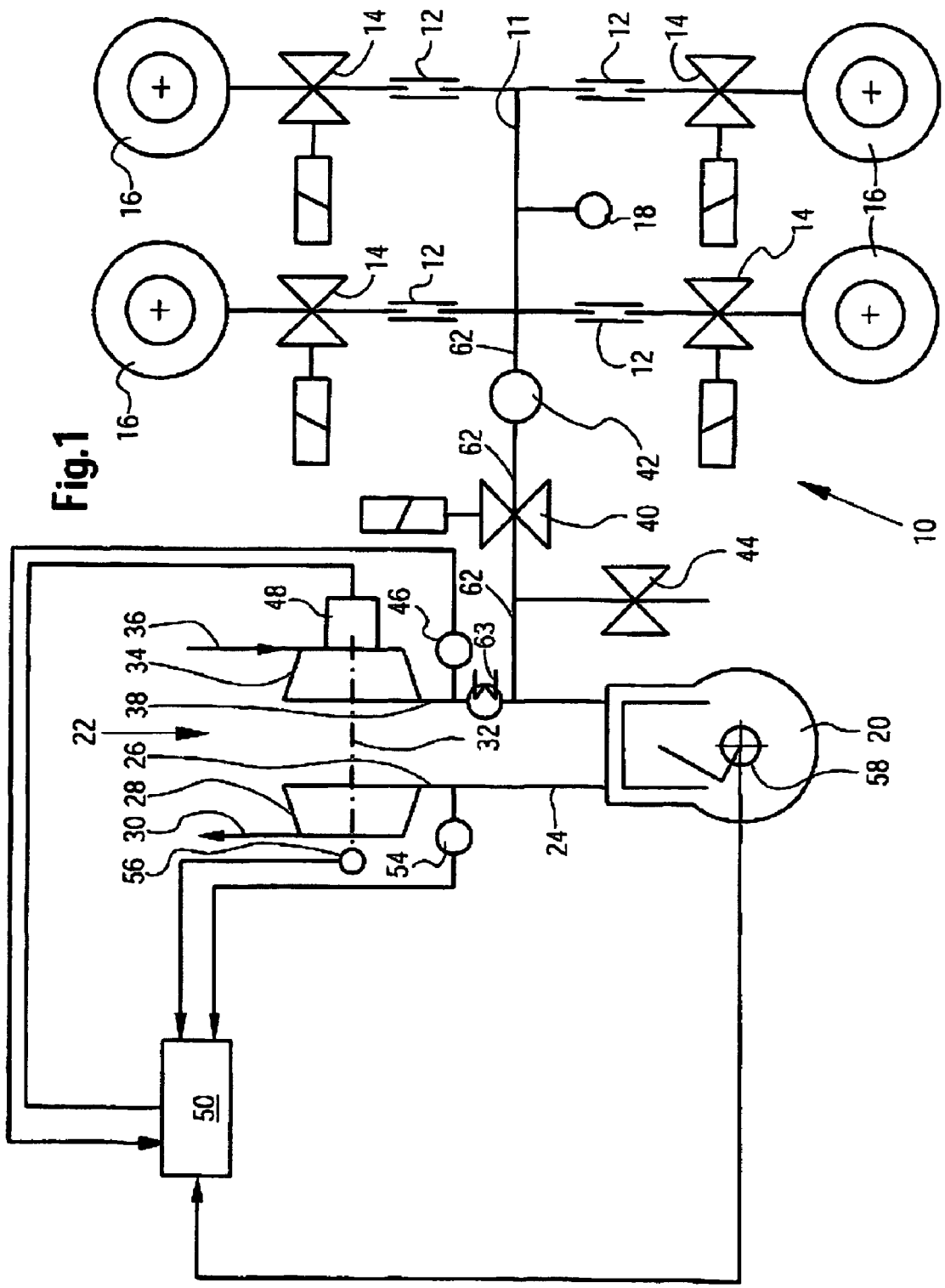
FIG. 1 is a schematic diagram of a first embodiment of the present invention.

The tire-pressure regulating system 10 shown in the right hand part of FIG. 1 contains a distributing line 11, also called a pressure line, which is connected via a rotary transmission leadthrough 12 and an associated valve 14 to the four tires 16 of a work vehicle not shown in more detail. The rotary transmission leadthroughs 12 and valves 14 can be formed in typical ways. For example, the valves 14 can be directional control valves. Another valve arrangement mounted before the leadthroughs can also be provided for preparing the supply pressure, which, however, was not shown because it is not the subject matter of the present invention. In the pressure line 11, there is a pressure measurement point 18.

In the left hand part of the figure, a combustion engine 20 is shown which is equipped with an exhaust gas turbocharger 22. The exhaust gas line 26 of the turbocharger 22 is attached to the connection angle 24 of the combustion engine 20. The exhaust gas turbine 28 of the turbocharger 22 in the exhaust gas line 26 is driven by the motor exhaust gas, which is led through the muffler 30 to the outside air. The exhaust gas turbine 28 drives the charged air compressor 34 of the turbocharger 22 by means of a shaft 32. The charged air compressor 34 draws in fresh air from the atmosphere via the inlet 36, compresses this fresh air, and outputs it via a charged air channel 38 to the combustion engine 20.

The charged air channel 38 is connected to the pressure line 11 of the tire-pressure regulating system 10 via a connecting valve 40 and a secondary compressor 42. The secondary compressor 42 is unnecessary in most applications, because the turbocharger 22 is usually in the position to provide a sufficiently high pressure for the tire-pressure regulating system 10. If necessary, a typical compressor can be used as the secondary compressor 42. The connecting valve 40 can be controlled electromagnetically and is closed when no electrical signal is applied. It can be designed as a pressure-regulating valve to set the optimum pressure for the tire-pressure regulating system 10.

A so called waste gate valve 44, through which the optimum operating point of the combustion engine 20 can be set, is connected to the charged air channel 38. For pressure monitoring in the charged air channel 38, there is a pressure sensor 46, whose pressure signals are used, among other things, to change the motor rpm. If a tire is being filled with air, the motor rpm is set so that the turbocharger 22 provides a sufficient filling pressure.

According to the invention, the tire-pressure regulating system shown in FIG. 1 is equipped with a turbocharger 22 as a compressed-air source, which has a variable geometry. The geometry of the turbocharger is changed relative to the adjustment of the guide blades and the working blades of the charged air compressor 34, which is not shown in detail. In detail, the geometry of the turbocharger 22 is changed with the aid of a low pressure diaphragm dashpot 48. The low pressure diaphragm dashpot 48 is electrically controlled or driven by the controller 50 allocated to the tire-pressure regulating system.

The tire-pressure regulating system includes several sensors 46, 54, and 56, wherein the sensors 46 and 54 each detect the pressure on the suction side or exhaust gas side of the combustion engine 20 and generate electrical signals, which are a function of the detected pressure and which are fed to the controller 50. The rpm sensor 56 detects the rpm of the turbocharger 22 and also feeds the electrical signals generated as a function of the rpm of the turbocharger 22 to the controller 50. Furthermore, there is an rpm sensor 58 of the combustion engine 20. This sensor generates electrical signals as a function of the rpm of the combustion engine 20 detected by the sensor and supplies the signals to the controller 50.

Figure 2:
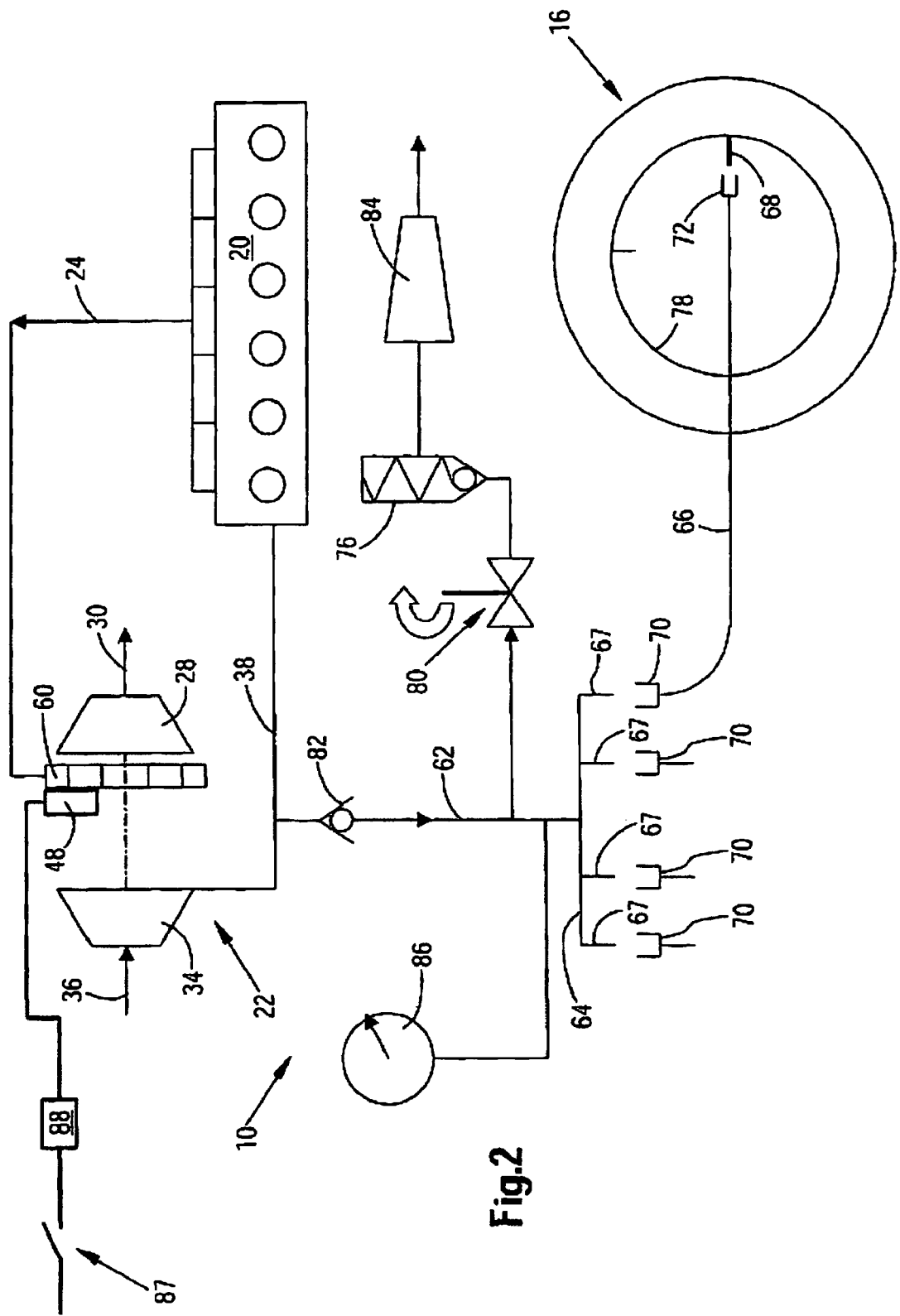
FIG. 2 is a schematic diagram of a second embodiment of the present invention.
Figure 3:
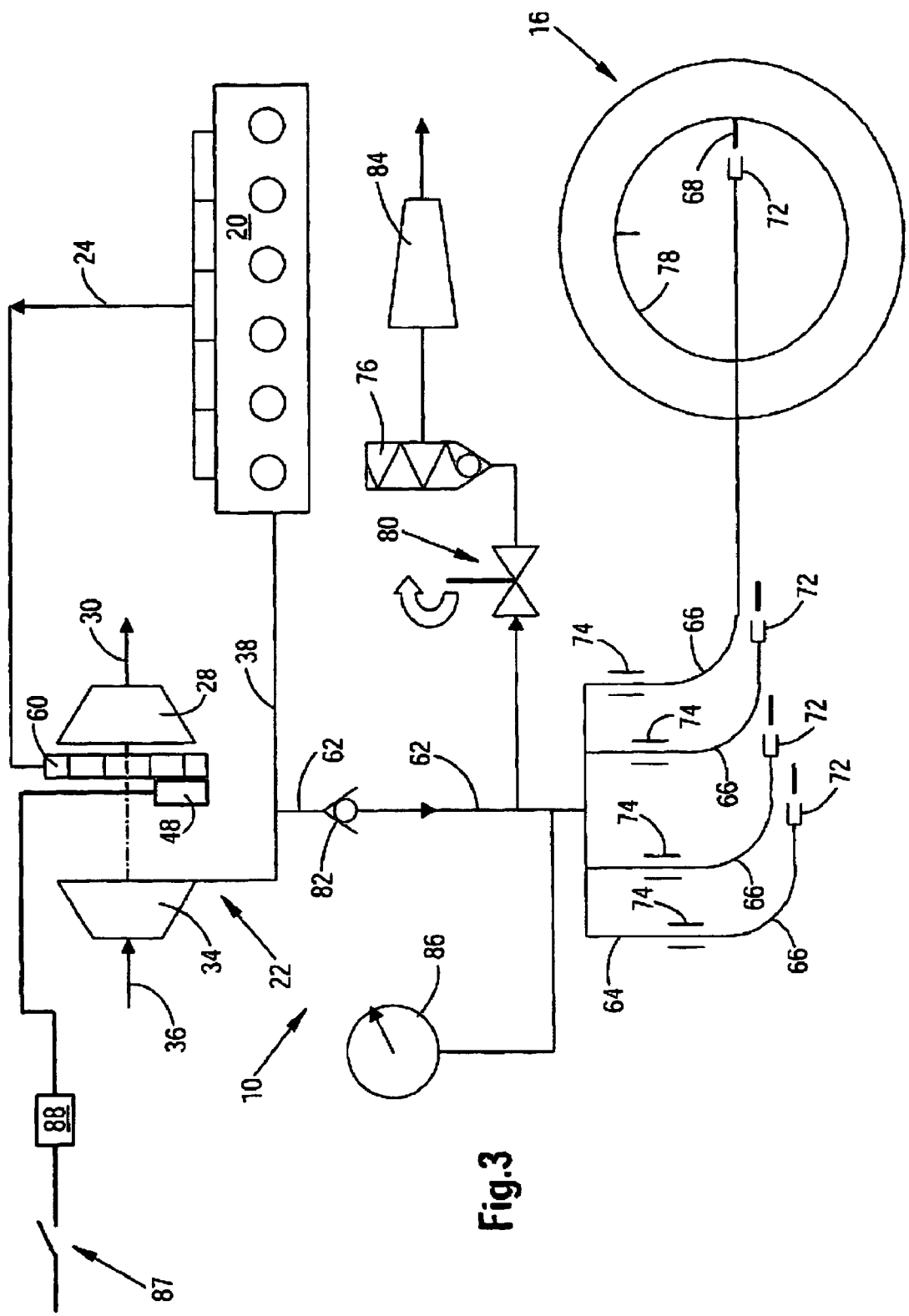
FIG. 3 is a schematic diagram of an embodiment modified relative to FIG. 2.

FIGS. 2 and 3 each show another embodiment of the present invention, wherein, in FIGS. 1-3, identical or similar components are designated with the same reference symbols. Thus, for example, the arrangement of the turbocharger 22 and the combustion engine 20 shown in FIGS. 2 and 3 is comparable to the arrangement shown in FIG. 1. In FIGS. 2 and 3, the variable exhaust gas side guide blades 60 of the turbocharger 22 are shown.

The air fed and compressed by the charged air compressor 34 is fed on one side via the charged air channel 38 to the combustion engine 20 and on the other side via the connecting line 62 to the tire 16. The charged air compressed by the charged air compressor 34 is cooled with the charged air cooler 63 shown in FIG. 1.

In the embodiment according to FIG. 2, the connecting line 62 is mounted permanently to the vehicle up to the coupling connection 64. The coupling connection 62 is embodied in the form of a distributor box, which has four quick connect couplings 67, which are connected on the vehicle side to individual hose couplings 66 if the tire is to be inflated or deflated. On the wheel side, a hose coupling 66 is connected to a valve 68 of a tire 16. Here, the vehicle is at a standstill. The vehicle side end 70 of the hose coupling 66 and the wheel side end 72 of the hose coupling 66 each comprise a quick connect coupling which can be screwed onto a threaded tube welded into the rim in a self locking way or which is connected to a quick connect coupling 67 on the vehicle side.

In FIG. 3 it is shown that rigidly mounted transitions 74 are provided between the connecting line 62 and the hose couplings 66 on the distributor box with the vehicle side coupling connection 64. In this respect, for filling or for emptying the tire 16, only the wheel side connection between the wheel side end 72 of the hose coupling 66 and the corresponding valve 66 of a tire 16 is to be connected. Accordingly, the hose couplings 66 from the embodiment according to FIG. 3 are connected rigidly to the vehicle and are stored in corresponding holders on the vehicle (not shown in FIG. 3) during normal driving.

Instead of the four quick connect couplings 67 and hose couplings 66 shown in FIG. 2 and instead of the four transitions 74 and hose couplings 66 shown in FIG. 2, only one hose coupling can be provided. In this case, the tires 16 of the vehicle must be filled or emptied one after the other.

When releasing air from the tire 16, the pressure-limiting valve 76 prevents the pressure from dropping below a preset value, which in the present case has been set to 0.3 bar. In this respect, the tire 16 is prevented from completely deflating and thus placing a wheel rim 78 on the ground. For emptying, the solenoid valve 80 is open.

Between the distributor box 64 and the charged air channel 38, there is a non return valve 82, which prevents excess pressure coming from a tire 16 from acting on the turbocharger 22. During the emptying of a tire 16, the loudness of the air emerging from the line system is damped with the sound damper 84.

With a manometer 86, the air pressure currently prevailing in the tire-pressure regulating system according to the invention is displayed to an operator. In this respect, an ability for the operator to inspect the operation of the tire-pressure regulating system is realized.

The following describes the work steps which are to be performed by a vehicle operator or by the tire-pressure regulating system according to the invention from FIG. 2, in order to achieve an increase in tire pressure. Thus, up to four hose couplings 66 rolled up into circles are removed from the storage containers provided on the vehicle and connected by the vehicle operator, on one side, to the quick connect coupling 67 and, on the other side, to the valve 68. Then the vehicle is brought to fast idling with standard gas, wherein the combustion engine 20 then exhibits an rpm of greater than 2000 rotations per minute. By activating the switch 87, the vacuum pump 88 is turned on, which changes the low pressure diaphragm dashpot 48 with low pressure, which changes the geometry of the guide blades 60 of the turbocharger 22. In this way, the compression of fresh air by the turbocharger 22 is increased. After the desired air pressure has been established in the tire 16 of the vehicle, which the vehicle operator checks using the manometer 86, the switch 87 is activated again, so that the guide blades 60 of the turbocharger 22 return to their original geometry. In this way, the standard gas is brought back to normal idling. The period for filling four tires to an air pressure of ca. 1.6 bar equals less than 2 min for a vehicle embodied in the form of a tractor with the tire-pressure regulating system according to the invention. Finally, the hose couplings 66 are to be decoupled from the vehicle and wheel sides and stored in the corresponding storage containers. The vehicle is then ready to be driven.

The work steps provided for deflating the tire or reducing the air pressure differ from the steps just described essentially in that after connecting the connecting line 62 to the hose couplings 66, the solenoid valve 80 is opened and the vehicle operator monitors the falling pressure profile on the manometer 86. When the desired air pressure is reached, the solenoid valve 80 is closed. Here, for a tractor, an emptying time of the four tires 16 of less than one minute can be achieved.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

The invention claimed is:

1. A tire-pressure regulating system for regulating the pressure of a tire mounted on a vehicle having a combustion engine with a turbocharger, the turbocharger being a compressed-air source for the tire-pressure regulating system, characterized by:
   the turbocharger having a variable geometry;
   a connecting line connecting the turbocharger to the tire;
   a flexible hose coupling for manually connecting the connecting line to the turbochager; and
   a controller connected to the turbocharger, the controller controlling turbocharger geometry to increase air pressure when filling the tire.

2. The tire-pressure regulating system according to claim 1, wherein:
   one end of the hose coupling is reversibly connectable to a wheel side coupling system with a quick connect system.

3. The tire-pressure regulating system according to claim 2, wherein:
   an other end of the hose coupling is connectable to a vehicle side coupling connection.

4. The tire-pressure regulating system according to claim 1, wherein:
   an end of the hose coupling has a self locking quick connect coupling.

5. The tire-pressure regulating system according to claim 1, wherein:
   the hose coupling has an open diameter of at least ½ inch.

6. A tire-pressure regulating system for regulating the pressure of a tire mounted on a vehicle having a combustion engine with a turbocharger, the turbocharger being a compressed-air source for the tire-pressure regulating system, characterized by:
   the turbocharger having a variable geometry;
   a controller connected to the turbocharger, the controller controlling turbocharger geometry to increase air pressure when filling the tire; and
   a non return valve arranged between the turbocharger and the tire, the non return valve preventing a high pressure coming from the tire from acting on the turbocharger.

7. A tire-pressure regulating system for regulating the pressure of a tire mounted on a vehicle having a combustion engine with a turbocharger, the turbocharger being a compressed-air source for the tire-pressure regulating system, characterized by:
   the turbocharger having a variable geometry;
   a controller connected to the turbocharger, the controller controlling turbocharger geometry to increase air pressure when filling the tire; and
   a pressure-limiting valve dames sound generated when air is let out of the tire.

* * * * *